US 6,607,073 B2

(12) United States Patent
Büchi et al.

(10) Patent No.: US 6,607,073 B2
(45) Date of Patent: Aug. 19, 2003

(54) CONVEYOR SYSTEM

(75) Inventors: Robert Büchi, Weinfelden (CH);
Daniel Hinder, Wil (CH)

(73) Assignee: Denipro AG, Weinfelden (CH)

( * ) Notice: Subject to any disclaimer, the term of this patent is extended or adjusted under 35 U.S.C. 154(b) by 0 days.

(21) Appl. No.: 10/068,390

(22) Filed: Feb. 6, 2002

(65) Prior Publication Data

US 2002/0117378 A1 Aug. 29, 2002

(30) Foreign Application Priority Data

Feb. 7, 2001 (CH) ................................ 0215/01

(51) Int. Cl.⁷ ........................................ B65G 15/60
(52) U.S. Cl. ........................... 198/805; 198/832
(58) Field of Search ................... 198/805, 832

(56) References Cited

U.S. PATENT DOCUMENTS

| | | | |
|---|---|---|---|
| 2,824,638 A | | 2/1958 | DeBurch |
| 3,610,406 A | * | 10/1971 | Fleischauer ............... 198/127 |
| 4,088,213 A | | 5/1978 | Nakamura et al. |
| 5,172,803 A | * | 12/1992 | Lewin ....................... 198/619 |
| 5,388,685 A | * | 2/1995 | Szuba ....................... 198/803.2 |
| 5,440,997 A | * | 8/1995 | Crowley ................... 104/283 |
| 6,092,801 A | * | 7/2000 | Abbadessa et al. ......... 271/204 |
| 6,112,879 A | * | 9/2000 | Fortenbery et al. .... 198/370.04 |
| 6,129,201 A | * | 10/2000 | Langhans ................. 198/805 |
| 6,155,406 A | * | 12/2000 | Garbagnati .............. 198/805 |
| 6,244,188 B1 | | 6/2001 | Buechi |

FOREIGN PATENT DOCUMENTS

| | | |
|---|---|---|
| DE | 199 16 922 A1 | 10/2000 |
| EP | 0 416 453 A1 | 3/1991 |
| EP | 0 709 320 A1 | 5/1996 |
| EP | 0 936 161 A1 | 8/1999 |
| FR | 2 085 160 A1 | 12/1971 |

OTHER PUBLICATIONS

WO 99/33731, Conveyor System, Publication Date Jul. 8, 1999.

* cited by examiner

Primary Examiner—Christopher P. Ellis
Assistant Examiner—Rashmi Sharma
(74) Attorney, Agent, or Firm—Rankin, Hill, Porter & Clark LLP

(57) ABSTRACT

In a conveyor system, a magnet element row aligned at least partly parallel to the conveyor path is arranged in a driving region to serve as a stationary drive device. Conveyor elements include conducting parts (4) and are movable along the conveyor path through the drive region. The magnet element row (11) includes alternatingly orientated permanent magnets and produces a magnetic field locally changing along the row (11). The conducting parts (4) are arranged on the conveyor elements (2) such that in the drive region they are positioned in the effective range of the magnet element row (11). A relative movement between the magnetic element row (11) and the conveyor element (2) produces eddy currents in the conducting parts (4) effecting forces counteracting the relative movement. The relative movement is produced by annular magnet element rows (11) that are revolvingly driven and of which a part moves parallel to the conveyor path being in interaction with the conducting parts (4) of conveyor elements (2). The drive device works without contact and permits jolt-free conveyance, particularly when used in conjunction with independently movable conveyor elements.

13 Claims, 4 Drawing Sheets

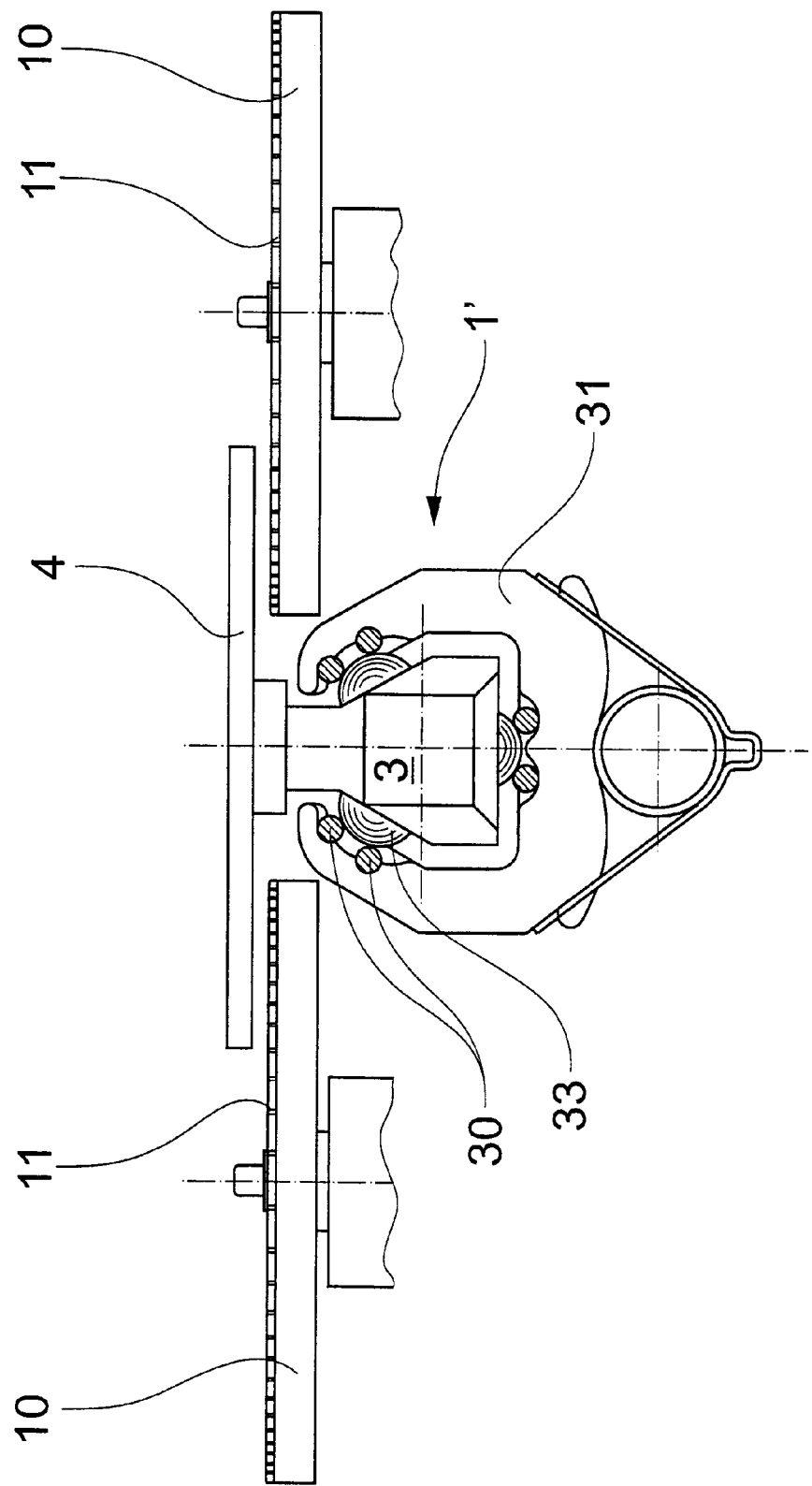

CONVEYOR SYSTEM

BACKGROUND OF THE INVENTION

The present invention relates to the field of conveyor technology and concerns a conveyor system comprising a large number of conveyor elements movable along predetermined conveyor paths as well as at least one stationarily arranged drive means acting locally on the conveyor elements in an accelerating or braking manner.

The conveyor elements are connected to one another at constant or variable distances via jointed or flexible connections to form a chain or they are displaceable independently of one another along the conveyor paths and are, where necessary or advantageous, guided by suitable guide means. Such guide means are, for example, guide channels or channel-like rail arrangements along which the conveyor elements roll or slide. Chain wheels, which are locally in engagement with the conveyor elements, may also serve as guide means.

The at least one drive means acts locally in an accelerating or braking manner on those conveyor elements that are present in the effective range of the drive means (drive region) and which, where appropriate, transmit the accelerating or braking effect by pulling or pushing to other conveyor elements.

Conveyor systems of the mentioned type are, for example, used for piece good processing where large numbers of equal or similar objects are processed in a plurality of processing steps. The objects are, for example, individually held by grippers, each gripper being arranged on one conveyor element. For a process or a part thereof, in which all objects run through the same sequence of processing steps one after the other in a uniformly cycled manner, the conveyor elements are advantageously connected with one another to form a chain. For a process or a part thereof in which the objects run through individual sequences of processing steps and/or are individually processed in processing stations, and therefore the conveying course of individual objects may be different from one another, conveyor elements being independent of one another are advantageous as they allow conveyance without the need of repeated transfer of the objects from one gripper to another one.

Drives for conveyor systems of the mentioned type are, for example, revolving gearwheels or toothed belts which, for transmitting a drive force, are brought into engagement with the conveyor elements in a positive fit and essentially without slip. Through such engagement independent conveyor elements lose their independence, since all conveyor elements in engagement are compellingly subjected to the conveying speed and the conveying cycle of the drive. Particularly in the region in which the conveyor elements come into engagement with the drive, this entails jolt-like movements through which high forces act on the material and lead to an increased wear.

So-called string drives, as for example described in the publication EP-0936161, are also applicable in the mentioned conveyor systems. Such a drive comprises a driven string being moved parallel to the conveyor path of the conveyor elements and, for being driven, the conveyor elements are coupled to the string via suitable means essentially effecting a friction fit. Since the string in contrast to gearwheels or toothed belts represents a so-to-say continuous coupling means, the conveyor elements may be coupled to it independent of a conveyor cycle. However, as slip between the string and conveyor elements increases material wear, slip must be avoided as much as possible. Therefore, in such a system the drive speed or the speed of the string respectively dictates the conveying speed. This means that although the conveyor elements can be driven in a manner independent of a conveyor cycle, i.e., at any distance to one another, once coupled to the string they can only be driven at the speed of the string. This leads to the disadvantages mentioned hereinbefore in connection with the toothed drive means.

From the publication WO-99/33731 it is also known to drive the conveyor elements of a conveyor system by coupling them to drive elements with the help of a magnetic attraction force acting essentially transverse to the conveyor path and by moving the drive elements in a drive region with the help of gearwheels or similar means parallel to the conveyor path of the conveyor elements. If the drive means and the parts of the conveyor elements to be coupled thereto are designed suitably flat, such a magnetic coupling allows conveyance without a predetermined conveying cycle and, since slip between conveyor elements and drive elements entails lower material wear than this is the case with the above mentioned string drive, there is no compelling predetermined conveying speed for the conveyor elements. With such a drive it is, for example, possible to bring conveyor elements into the effective region of the drive in a jolt-free manner or to push conveyor elements into a buffer having a variable length in which buffer the conveyor elements have a conveyor speed different from the drive speed or even stand still.

SUMMARY OF THE INVENTION

It is an object of the invention to provide a conveyor system of the above mentioned type, in which conveyor system conveyor elements displaceable along conveyor paths are accelerated or decelerated in a drive region by at least one essentially stationary drive means such that neither the conveying cycle nor the conveying speed of the conveyor elements are compellingly predetermined by the drive. All the same, the drive is to be simple with regard to the device and control and is to function essentially without material wear.

The drive means of the conveyor system according to the invention works with the eddy current principle. Eddy currents are produced in a conducting material by way of a magnetic field changing with time. Thereby forces counteracting the change are affected. This effect is exploited in the drive means of the conveyor system according to the invention in that a magnetic field changing with time is produced in a conducting part by a relative movement between this conducting part and a magnetic field which changes locally in the direction of the relative movement (field lines with components transverse to the direction of the relative movement). The eddy currents produced in the conducting part effect forces counteracting the relative movement, i.e. to decelerate or brake it.

In the conveyor system according to the invention, the conveyor elements comprise conducting parts and the drive means comprise a row of magnetic elements (elements producing a magnetic field) for producing a locally changing magnetic field in a drive region. The row is aligned at least partly substantially parallel to the conveyor path. The magnet element row of the drive means and the conducting parts of the conveyor elements are arranged relative to one another such that the conducting parts of conveyor elements present in the drive region are positioned in the effective range of the magnet element row. The relative movement necessary for producing the eddy currents is achieved by moving the conveyor elements along the conveyor path through the drive region and/or by moving the magnet element row or parts thereof essentially parallel to the conveyor path.

In the magnet row, magnet elements producing a magnetic field alternate with elements producing another magnetic field or with elements producing no magnetic field. The elements producing the various magnetic fields are, for example, permanent-magnetic north and south poles, which in the row are arranged alternating next to one another.

The magnitude of the braking or accelerating effect between the drive means and the conveyor elements is dependent on the magnitude of the temporal change of the magnetic field, i.e. on the strength of the magnetic fields produced by the magnet elements, on the differences between the magnetic fields produced by the magnet elements of various types, on the distance between the magnet elements in the magnet element row, on the relative speed between the magnet element row and conveyor elements and on the distance between the conducting parts and the conveyor elements. A given drive effects braking or accelerating forces, which are essentially proportional to the speed of the relative movement and inversely proportional to the square of the distance between the magnet element row and the conducting parts.

If the magnet element row is arranged stationary, it can only act on the conveyor elements in a braking manner. Similarly, a magnet element row being moved essentially parallel to the conveyor path in the direction opposite to the conveying direction can only act on the conveyor elements in a braking manner. If the magnet element row is moved essentially parallel to the conveyor path and in the conveying direction, it decelerates conveyor elements having a speed larger than the speed of the magnet element row and it accelerates conveyor elements having a smaller speed.

A preferred embodiment of the conveyor system according to the invention comprises a drive means comprising an annular row of alternatingly arranged permanent magnets such that south and north poles of the magnets face the conducting parts alternatingly. The permanent magnets are arranged with the smallest possible distance to one another, for example, on a rotating disk or a revolving conveyor means. The disk or deflection means of the conveyor means respectively rotate about axes which are arranged essentially transverse to the conveyor path and spaced from the conveyor path such that the part of the magnet element row lying closest to the conveyor path has a revolving direction parallel to the conveyor path or has a tangent parallel to the conveyor path.

In order to avoid accelerations of the conveyor elements transverse to the conveyor path as much as possible, it is advantageous to arrange in a drive region two equal rows of magnet elements, with the rows lying as exactly as possible opposite to one another and revolving with the same speeds in opposite directions.

The conducting parts of the conveyor elements consist advantageously of a paramagnetic material, such as aluminum, and project transversely to the conveying direction into the effective range of the magnet element row, wherein the distance between conducting parts and magnet elements is as small as possible. The conducting parts are designed such that between conducting parts of neighboring conveyor elements there is no conducting connection, even when the conveyor elements move in a compact succession through the drive region.

For controlling the accelerating or braking effect of the drive means, the revolving speed of the magnet element row and/or the distance between magnet elements and conducting parts are adjustable. When using an electrically produced magnetic field it is also possible to adjust the strength of this field.

BRIEF DESCRIPTION OF THE DRAWINGS

Advantageous embodiments of the conveyor system according to the invention are described in more detail in combination with the following drawings, wherein:

FIGS. 7 and 8 show a further, exemplary embodiment of the conveyor system according to the invention in a three-dimensional representation (FIG. 7) and in a section transverse to the conveyor path (FIG. 8).

DETAILED DESCRIPTION OF THE PREFERRED EMBODIMENTS

Figure 1:
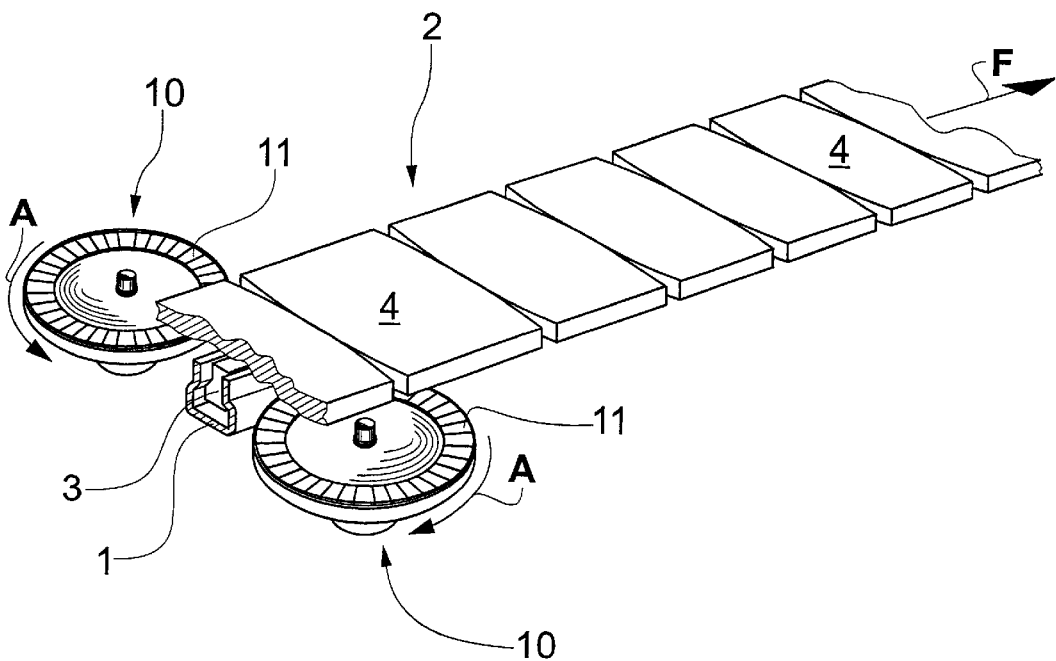
FIG. 1 shows part of an exemplary embodiment of the conveyor system according to the invention with magnet element rows arranged on rotating drive disks.

FIG. 1 shows very schematically part of a conveyor path of an exemplary embodiment of the conveyor system according to the invention. The drawing shows a guide means 1, for example a guide channel, defining the conveyor path and a plurality of conveyor elements 2 displaceable along the conveyor path. Of the conveyor elements only roller or gliding bodies 3 guided in the guide channel 1 and conducting parts 4 extending in a flat manner outside the guide channel 1 are shown. The conveyor elements 2 are represented in a compact succession, which means they are connected to one another in a chain or they are more or less independent of one another and are driven abutting one another. The conducting parts 4 are dimensioned and designed such that even in such a compact succession of conveyor elements 2 there is no conducting contact between the conducting parts 4 of neighboring conveyor elements 2.

The conveyor elements 2 may further comprise, for example, one gripper (not shown) each or another means for firmly holding an object to be conveyed. On the other hand, they may comprise no such holding means and serve as force transmission means for driving a further conveyor or other movement.

The drive means arranged on both sides of the guide channel 1 comprises a rotating drive disk 10. The disk axes are transverse to the conveyor path and distanced from this. On the side facing the conducting parts 4, the drive disks carry an annular magnet element row 11 running along the disk periphery. The magnet elements of the row are for example alternatingly orientated permanent magnets (see FIGS. 2 and 3).

The drive direction A in which the drive wheels 10 are rotatingly driven is selected such that the parts of the magnet element row 11 in interaction with the conducting parts 4 move on a circular arc whose middle tangent runs parallel to the conveyor direction F, wherein the movements of conveyor elements 2 and magnet elements have the same direction.

In FIG. 1 the disks 10 are arranged essentially horizontally. This is not a required condition for the conveyor system according to the invention. The disks may have any spacial orientation.

Figure 2:
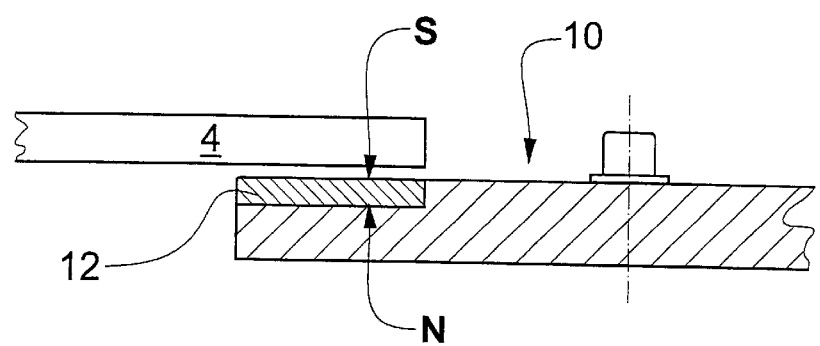
FIGS. 2 and 3 show two examples of drive disks for the conveyor system according to FIG. 1.
Figure 3:
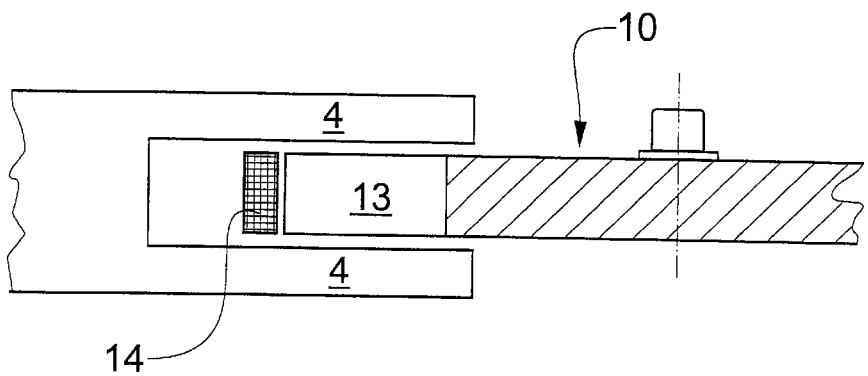

FIGS. 2 and 3 show two examples of drive disks 10 applicable in conveyor systems according to the invention as shown in FIG. 1. In FIGS. 2–3 the drive disks are shown sectioned along their axis and suitable conducting parts 4 are also shown.

The drive disk 10 according to FIG. 2 comprises an annular row of permanent magnets 12 of which, in each case, one pole is turned towards the conducting part 4, this pole being alternatingly the south pole S and the north pole N. For directing the magnetic field towards the conducting part the support of the permanent magnets 12 consists advantageously of iron. The permanent magnets are in particular through-magnetized and nickel-coated NbFeB plates with a thickness of 5 mm. The distance between permanent magnets 12 and conducting parts 4 should be as small as possible, for example 0.5 to 2 mm.

In an analogous manner and as shown in FIG. 2, the permanent magnets 12 may also be arranged on the circumferential surface of the drive disk 10. The conducting parts 4 are correspondingly designed and arranged.

The drive disk 10 according to FIG. 3 consists of, for example, steel or another ferromagnetic material, comprises on the periphery teeth 13 serving as magnet elements and between the teeth intermediate spaces and it rotates within a coil 14 carrying a direct current and producing a homogeneous magnetic field in the region of the teeth.

Figure 4:
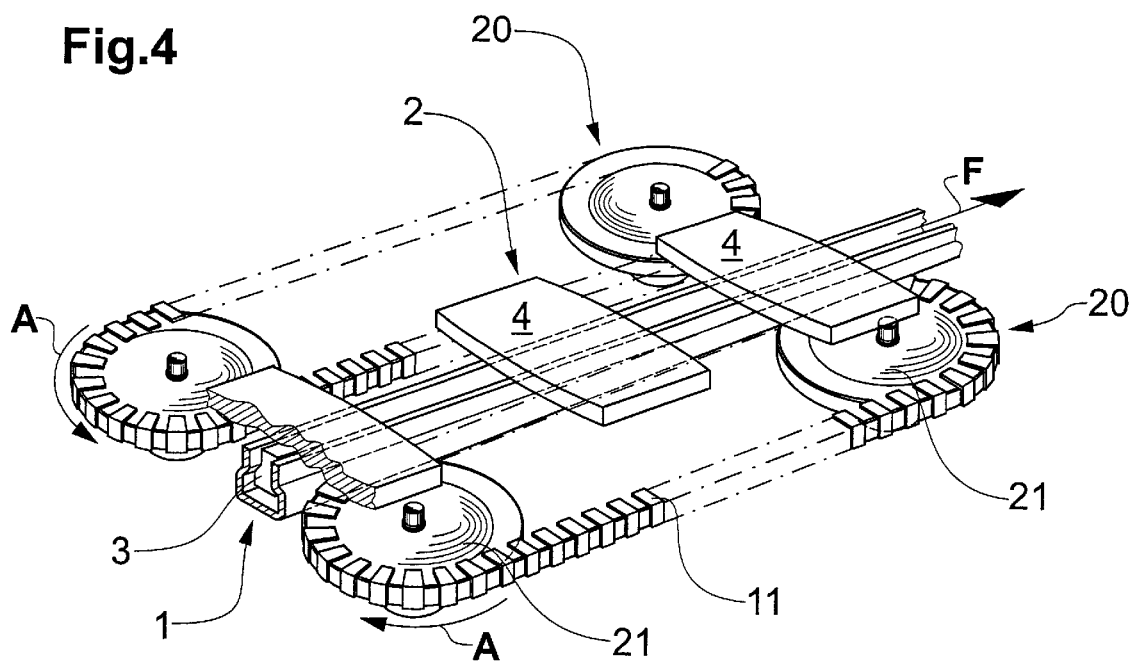
FIG. 4 shows part of a further, exemplary embodiment of the conveyor system according to the invention with magnet element rows arranged on revolving drive belts.
Figure 5:
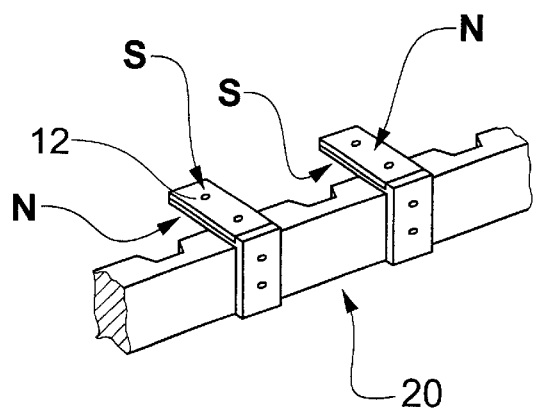
FIG. 5 shows a detail of an exemplary drive belt for the conveyor system according to FIG. 4.

FIG. 4 shows a similar example of a conveyor system according to the invention as FIG. 1. It comprises as a drive means rotating drive belts 20 being designed as toothed belts and carrying, as shown in detail in FIG. 5, along the one edge facing the conducting parts 4 of the conveyor elements 2, magnet element rows which consist of alternatingly arranged permanent magnets 12.

The drive belts 20 run for example over two deflection rollers 21 whose axes are aligned transverse to the conveyor path, wherein the distance between the guide channel 1 and the two axes is the same and is selected such that a driving part of the magnet element row 11 is in interaction with conveyor elements 2 present in the drive region.

Advantageously, two drive belts 20 are arranged opposite one another and revolving in opposite directions A such that the driving part of the two magnet element rows 11 is moved parallel to the conveyor path or to the guide channel 1. With a suitable arrangement of the conducting parts 4 the magnet elements may also be arranged on the surface of the drive belt 20 instead of on its edge.

The conveyor elements 2 shown in FIG. 4 are the same as the conveyor elements of FIG. 1, but they are independent of one another and have varying distances to one another.

Figure 6:
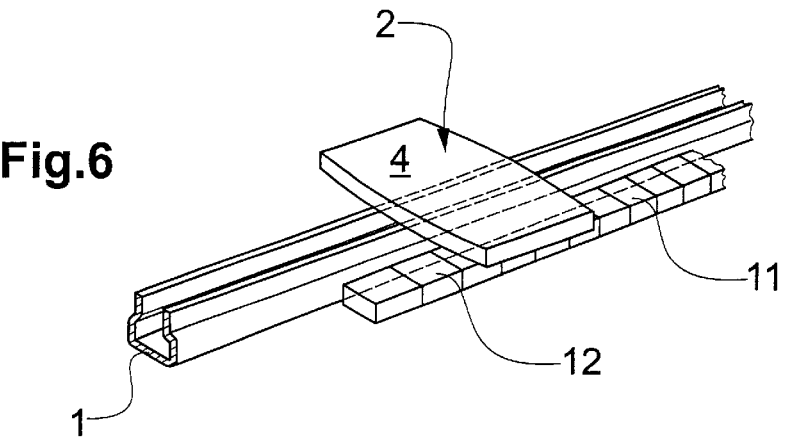
FIG. 6 shows a further, exemplary embodiment of the conveyor system according to the invention with a stationary magnet element row.

FIG. 6 shows a further exemplary embodiment of the conveyor system according to the invention. This embodiment comprises as a drive means or braking means a stationary magnet element row 11 arranged essentially parallel to the conveyor path or guide channel 1 and comprises alternatingly arranged permanent magnets 12. Their position relative to the conducting parts of the conveyor elements 2 is essentially the same as the position of the magnet element row on the drive belt 20 according to FIG. 4.

Figure 7:
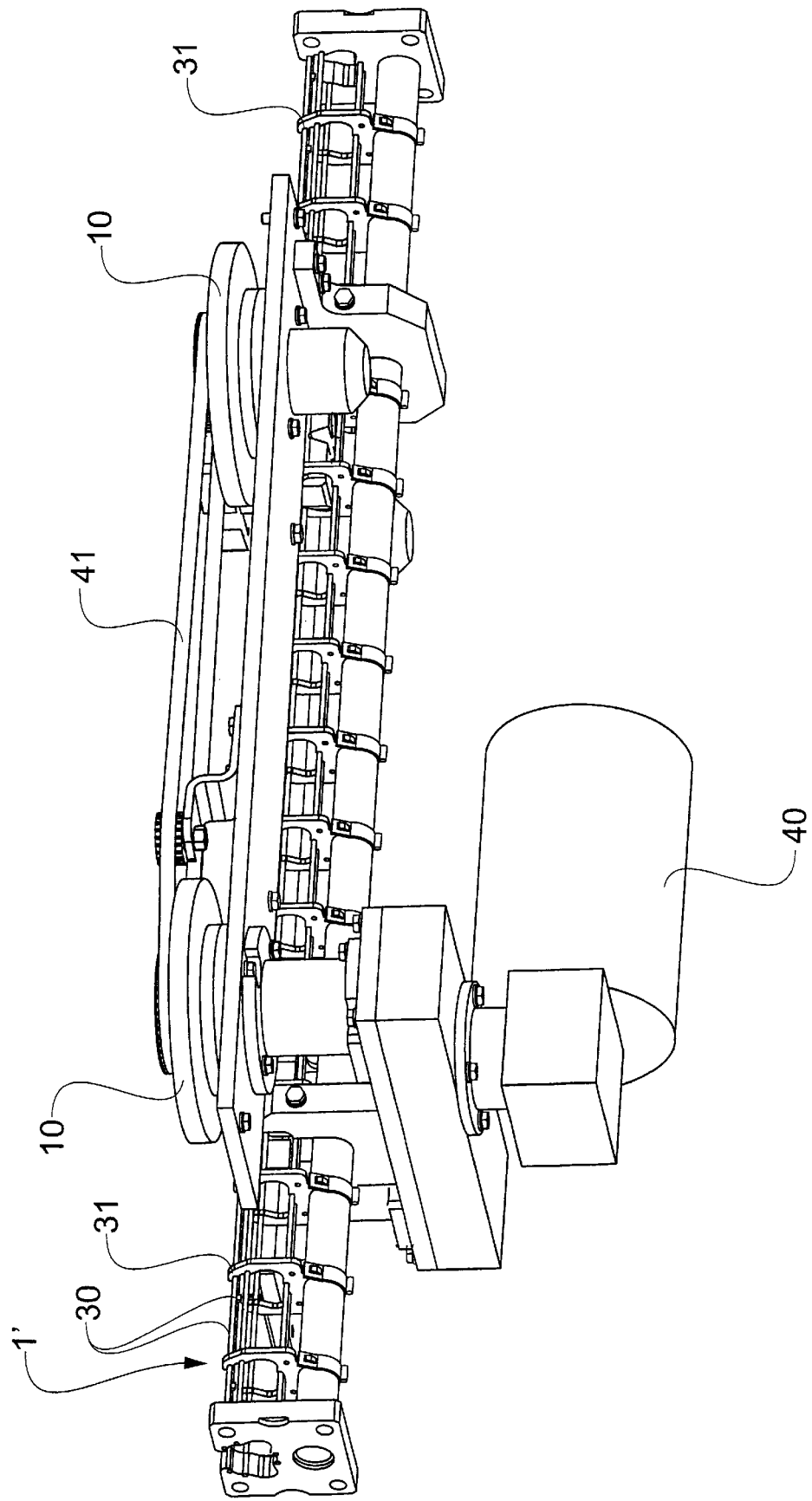

FIGS. 7 and 8 show more in detail a further, exemplary embodiment of the conveyor system according to the invention as a three-dimensional representation (FIG. 7) and sectioned transverse to the conveyor path (FIG. 8).

The conveyor path is defined by a channel-like rail arrangement 1' essentially consisting of rails 30 arranged parallel to one another and being held by holding webs 31 distanced from one another. In this channel-like rail arrangement 1' there are guided roller bodies 3, which in each case comprise at least one group of three balls 33. The balls roll on one another and in each case on two rails 30 and permit an extremely low-friction movement of the roller body 3 along the rail arrangement 1'. On the roller bodies 3 there are fastened conducting parts 4 that extend in a flat manner outside the channel-like rail arrangement 1' to two sides of the guide path.

The drive means comprise two pairs of drive disks 10 being arranged opposite one another, wherein the drive disks of each pair are arranged behind one another along the rail arrangement 1' and wherein the pairs of drive disks lie opposite one another symmetrically with respect to the rail arrangement 1'.

For driving the four drive disks 10 a single motor 40 is provided. The motor 40 drives the shafts of, in each case, a first drive disk of the two pairs via, for example, gearwheel gears. The shafts of the two drive disks of each pair are connected to one another via belts 41.

It is not a condition for the invention that the conducting part 4 of the conveyor elements 2 extends outside a guide channel 1 or a channel-like rail arrangement 1' in which the conveyor elements 2 are guided. In particular with a guide means as represented in FIGS. 7 and 8, it is evidently also possible to provide the conducting part 4 inside of the rail arrangement 1' and, for example, to bring a drive disk 10 into interaction with the conducting part 4 between two holding webs 31 and between two rails 30. A stationary magnet element row 11, as represented in FIG. 6, may also be arranged within a guide channel 1 or a channel-like rail arrangement 1'.

What is claimed is:

1. A conveyor system with predetermined conveyor paths, with conveyor elements (2) movable along the conveyor paths and with at least one drive means arranged stationarily in a region of one of the conveyor paths and acting in a drive region of said one conveyor path on the conveyor elements (2) in an accelerating or braking manner, wherein the drive means comprises a plurality of magnet elements (12) arranged in a row and producing a magnetic field changing along a magnet element row (11), wherein in the drive region at least part of the magnet element row (11) is arranged essentially parallel to the one conveyor path and wherein each conveyor element (2) comprises a conducting part (4) of electrically conducting material, said conducting part (4) being arranged on the conveyor element (2) such that, in the drive region, the conducting part is positioned in the effective range of the magnet element row (11) and such that a relative movement parallel to the conveyor path between the magnet element row (11) and a conducting part (4) produces eddy currents in the conducting part (4) and therewith forces counteracting the relative movement.

2. The conveyor system according to claim 1, wherein the magnet element row (11) is a row of alternatingly arranged permanent magnets (12).

3. The conveyor system according to claim 1, wherein the magnet element row (11) is a row of teeth (13), said teeth being spaced from one another and being formed from a ferromagnetic material, said row being positioned in an electrically produced, essentially homogeneous magnetic field.

4. The conveyor system according to claim 1, wherein, for a braking effect on the conveyor elements (2) moved through the drive region, the magnet element row (11) is stationary.

5. The conveyor system according to claim 1, wherein, for an accelerating or braking effect on conveyor elements (2), the magnet element row (11) or a driving part thereof is movable parallel to the conveyor path in the drive region.

6. The conveyor system according to claim 5, wherein, for controlling the braking or accelerating effect, the speed (A) of the magnet element row (11) is adjustable.

7. The conveyor system according to claim 5, wherein the magnet element row (11) is annular, revolvingly driven and is arranged on the one side of the conveyor path such that a driving part of the magnet element row, closest to the conveyor path, is moved parallel to the conveyor path.

8. The conveyor system according to claim 7, wherein the annular magnet element row (11) is arranged circularly on a drive disk (10), said drive disk (10) being positioned such that the conveyor path is aligned tangentially thereto.

9. The conveyor system according to claim 7, wherein the magnet element row (11) is arranged on an endless drive belt (20).

10. The conveyor system according to claim 9, wherein the drive belt (20) is guided over two deflection rollers (21) arranged behind one another along the conveyor path, said deflection rollers (21) having axes directed perpendicular to the conveyor path.

11. The conveyor system according to claim 5, wherein, in the drive region, two magnet element rows lying opposite one another and revolving in opposite directions are provided, and wherein the conducting part (4) of the conveyor elements (2) is designed such that it is moved through the effective range of both magnet element rows (11).

12. The conveyor system according to claim 1, wherein the conveyor paths are at least partly defined by guide channels (1) or channel-like rail arrangements (1') and wherein a roller or sliding part (3) of each conveyor element (2) is positioned in the guide channel (1) or in the rail arrangement (1') and the conducting part (4) projects out of the guide channel (1) or out of the rail arrangement (1').

13. The conveyor system according to claim 1, wherein a distance between the magnet element row (11) and the conducting part (4) of the conveyor elements (2) is adjustable.

* * * * *